Sept. 25, 1934.  E. W. LITTLE  1,974,823

ORNAMENTAL STRUCTURE FOR BIRD CAGES

Filed April 20, 1933

Inventor
EARL W. LITTLE
By Owen H. Spencer
Attorney

Patented Sept. 25, 1934

1,974,823

UNITED STATES PATENT OFFICE 1,974,823

ORNAMENTAL STRUCTURE FOR BIRD CAGES

Earl W. Little, Indianapolis, Ind.

Application April 20, 1933, Serial No. 666,967

4 Claims. (Cl. 119—17)

The invention is used as an imitation glass wall portion for bird cages, pertaining especially to wire bird cages having ornamental bands and the like and more particularly to bird cages which are suspended so as to be tilted and rotated slightly by movements of the bird within the cage, or be slightly moved in position by breeze and otherwise casually changed as to position.

It is an object to provide a reflective band ornament for bird cages having normally vertical corrugations composed of successively arranged reflecting faces of different angularity as considered from a given point of observation.

It is a primary object to provide a band for bird cages in successively varying sets of light reflecting faces, which resemble a series of parallel glass prisms, or the like, more especially when a quivering movement to the cage is imparted by the usual activities of the bird or by other forces.

It is an important object to provide a bird cage thus ornamented by which the cage when moved or caused to quiver in any direction, will throw off glimmering reflections in varying directions and give the appearance of a series of transparent prisms, or the like, and thus by the mechanical structure carried out add greatly to the beauty, attractiveness and novelty of a cage thus equipped.

It is a further object to provide such a cage, in combination with a yieldable suspension which permits the height of the cage to vary by movement of a bird confined within the cage, or by jar due to rumbling of heavy traffic and rail cars, and the equivalent, in the vicinity of the cage, thus causing the different faces of the ornamental band to glisten and further give the impression that the band is a series of prisms, mirrors, or the like.

It is also an object to provide a one piece simple and economically supplied substitution for a plurality of ornamental prisms, mirrors or cut glass pieces, or the like, and to provide a bird cage having a depressed portion in which such band is laterally confined, the borders of said portion being contrasted ornamentally in appearance from such band, in ornamentally coating the cage as a whole previously to applying the band.

Figure 1:
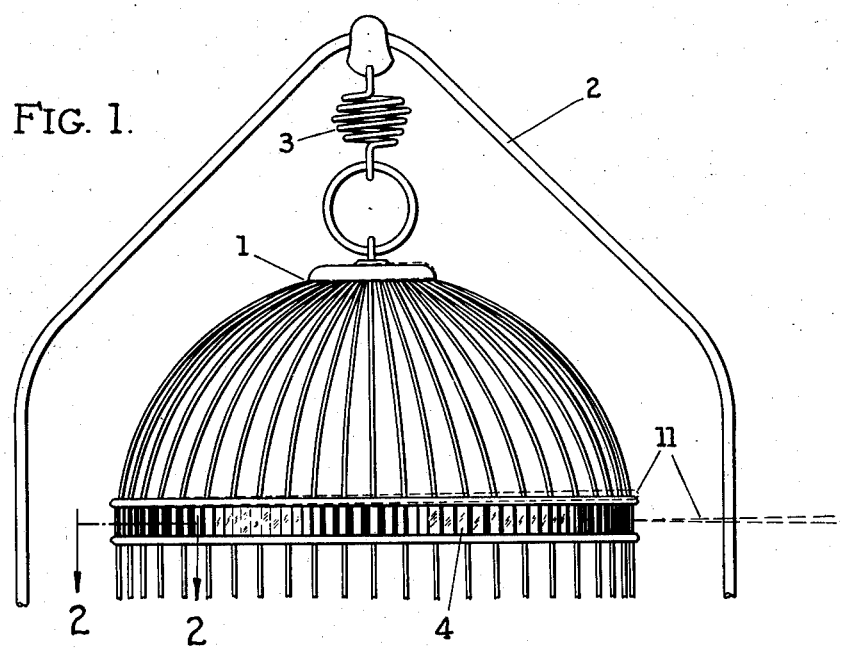
Figure 1 is a fragmentary elevational view of a bird cage, illustrating the invention.
Figure 2:
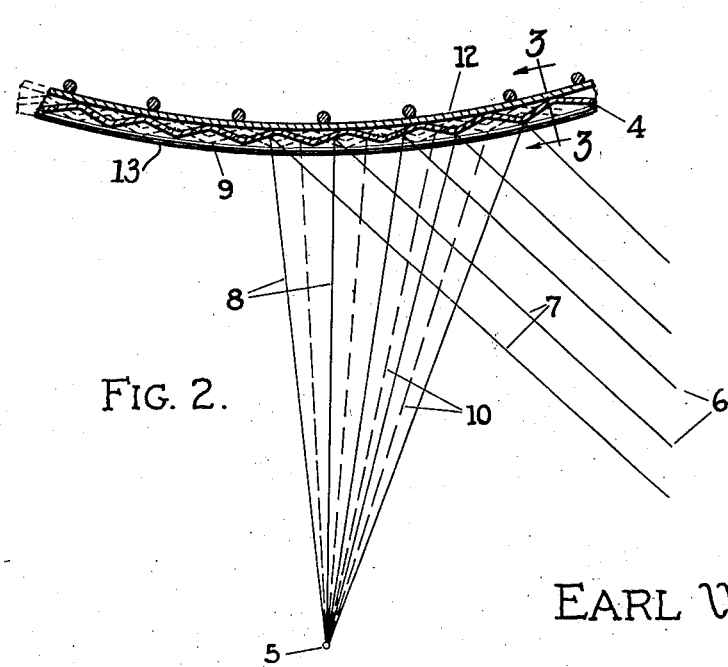
Fig. 2 is a partial cross sectional view taken in the proximity of line 2—2 of Fig. 1; and, Fig. 3 is a fragmentary cross section taken in the proximity of line 3—3 of Fig. 2.
Figure 3:
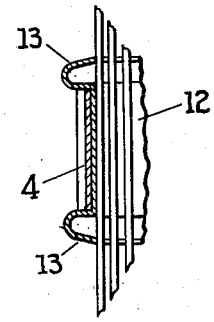

Referring to Fig. 1, the numeral 1 designates a dome type bird cage, which is suspended from the cage support 2 by the expansion coil spring 3. One or more ornamental bands 4, are secured about said cage. Referring also to Fig. 2, it will be observed that said band consists of a succession of faces in alternations of depressed and protruding portions and giving the resemblance of a continued series of laterally adjacent vertically arranged bodies.

The entire outer or exposed surface of said band is of brilliant character, preferably such as what is commercially termed "chrome plated" although it is understood that nickel or other plating may be used. It is of course understood that in embodying the invention with cages of the more expensive grades, said bands are made from sheet nickel, silver or the like, highly polished to attain the required brightness in appearance.

Bands of this formation and light reflecting qualities when applied to bird cages, more especially of round character, impress the casual observer that the cage is provided with a row of vertical transparent, glass or mirror faced prisms or the like, and serve in the same category of ornamentation as rows of suspended glass prisms or mirrors such as are embodied with hanging lamps or the like. This effect is multiplied by minute movement of the cage as caused by the normal activity of a bird confined therein, or as caused by slight breeze movement of the surrounding atmosphere, either of which imparts slight rotating or swaying movement, or both, to the cage, thus shifting the light reflections from one set of reflecting points to others. Assuming for illustration the point of observation to be a given point 5 of Fig. 2, to which light is reflected from a light source 6, when the band 4 is in position indicated by the solid lines, the light reflected is indicated by solid lines 7 and 8, and when said band is in the position indicated by the dotted lines 9, the respective points appear black and are seen by lines of vision indicated by the dotted lines 10; and since the cage usually rotates or sways in first one direction and another, the reflecting surfaces shuttle from brighter to darker positions with the twinkling effect attributable to cut glassware, or the like, of corresponding form, it being borne in mind that the difference in position is exaggeratedly indicated by dotted lines 9. It is also understood that in passing through the intermediate stages of change in position, the more brilliant and darker appearing surfaces appear to move from one point to another, thus giving a glimmering effect, as in the case of light reflected from the surface of slightly disturbed jewels. This is especially true in the swaying movements of the cage as will be understood from dotted lines 11 of Fig. 1, all of which adds to the beauty and deceptiveness of the invention. It is of course also understood that any degree of movement by the observer in relation to the cage will give substantially the same twinkling effect to the different faces of the band 4.

During the normal movements of the cage, and more particularly as imparted by activity of a bird or birds confined therein, the supporting spring suspension 3, expands and contracts to a slight degree, giving a slight vertical movement to the different reflecting surfaces of the band 4, which in combination with the rotating, swaying or any other movements of the cage, causes a slight vertical transfer of light reflective points, giving the other ornamental characteristics, a soft tone of blending indistinctness, corresponding to certain art requirements.

Said ornamental band is conveniently held in position by the underlying band 12, having ornamentally contrasting and locating beads 13, below and above the ornamental band, said underlying band being secured to the cage structure by welding, soldering, or any other method used in this particular field of endeavor.

From the foregoing it is obvious that a simple one piece substitution has been provided for a plurality of ornamental prisms, mirrors, cut glass pieces, or the ornamental equivalent; and that a cage has been provided with a portion within which said band is readily vested in the process of manufacture, and is definitely retained by securing the ends of the bands (not shown). The entire cage is conveniently ornamentally coated as by dipping or spraying, before applying the band, producing without any special effort a contrasting border for said band.

Since the band 4 is formed from a single piece of sheet material, the hollowness of the protruded portions of same, would be exposed to view but for the beads 13 which lap the band 4, as an abutment to said protruded portions, thus contributing to the impression that said portions are solid bodies.

The invention claimed is:

1. In combination with a bird cage, a light reflecting band ornament surrounding such cage and forming hollow protrusions alternating with depressed portions integral with the adjoining protrusions, said ornament resembling a succession of solid reflective bodies about the cage, a simple band structure lining said ornament exteriorly of the cage and ornamental beads on said cage, said beads abutting the edges of said ornament, concealing the hollowness at the ends of said protrusions, lending to the solid appearance of same, and serving as ornamental beads about the cage.

2. In combination with a bird cage, a light reflecting band ornament surrounding such cage and forming hollow protrusions alternating with depressed portions integral with the adjoining protrusions, said ornament resembling a succession of solid reflective bodies about the cage, and a recessed portion formed on said cage, said recessed portion containing said ornament and having side walls abutting the edges of said ornament, concealing the hollowness at the ends of said protrusions, lending to the solid appearance of same, and serving as ornamental abutments for said protrusions.

3. In combination with a bird cage, a light reflecting band ornament surrounding such cage and forming hollow protrusions alternating with depressed portions integral with the adjoining protrusions, said ornament resembling a succession of solid reflective bodies about the cage, a simple band structure lining said ornament exteriorly of the cage and forming a recessed portion on said cage, said recessed portion containing said ornament, and having side walls abutting the edges of said ornament, concealing the hollowness at the ends of said protrusions, lending to the solid appearance of same, and serving as ornamental abutments for said protrusions.

4. In combination with a bird cage, an ornamental light reflecting band resembling a succession of parallel prisms, and imitating a row of reflective body formations, and a recess means formed on said cage serving to retain said band in position, said recess means having ornamental beads formed thereon, said beads merging said recess with the more adjacent cage structure and serving as ornamentally contrasting borders for said band.

EARL W. LITTLE.